US012466054B2

(12) United States Patent
Naumann

(10) Patent No.: US 12,466,054 B2
(45) Date of Patent: Nov. 11, 2025

(54) SYSTEM FOR STORING AND ACCESSING ELONGATED IMPLEMENTS IN THEIR HOLDERS

(71) Applicant: Alexander Naumann, Carlsbad, CA (US)

(72) Inventor: Alexander Naumann, Carlsbad, CA (US)

( * ) Notice: Subject to any disclaimer, the term of this patent is extended or adjusted under 35 U.S.C. 154(b) by 12 days.

(21) Appl. No.: 18/217,584

(22) Filed: Jul. 2, 2023

(65) Prior Publication Data

US 2024/0227155 A1 Jul. 11, 2024

Related U.S. Application Data

(60) Provisional application No. 63/437,547, filed on Jan. 6, 2023.

(51) Int. Cl.
*B25H 3/00* (2006.01)

(52) U.S. Cl.
CPC .................................... *B25H 3/006* (2013.01)

(58) Field of Classification Search
CPC .................................. B25H 3/006; B25H 3/04
USPC ..................................................... 248/220.21
See application file for complete search history.

(56) References Cited

U.S. PATENT DOCUMENTS 1,906,874 A * 5/1933 Platt ...................... A47L 13/512 24/457
3,267,536 A * 8/1966 Brown ...................... A45F 5/02 24/66.12
4,787,582 A * 11/1988 Geleziunas ............ A47G 21/14 248/37.3
4,790,461 A * 12/1988 Stover ....................... A45F 5/00 224/678
4,932,529 A * 6/1990 Levine ................... A47G 1/142 40/701
5,052,603 A * 10/1991 Spina ........................ A45F 5/02 224/672
5,452,830 A * 9/1995 Hopkins ................ B25H 3/027 224/678
5,957,421 A * 9/1999 Barbour ................... B25H 3/04 248/314
6,142,320 A * 11/2000 DeLorean ............... A47L 13/51 211/105.3

(Continued)

FOREIGN PATENT DOCUMENTS

FR 2469895 A3 * 5/1981 ............... B25H 3/04

*Primary Examiner* — Ernesto A Grano
*Assistant Examiner* — Symren K Sanghera
(74) *Attorney, Agent, or Firm* — Continuum Law; Robert P. Cogan

(57) ABSTRACT

An apparatus stores elongated implements, each in a holder, such as a knife in a scabbard. The storage system allows for removing the holder from the system and immediately placing it in use. A vertical support wall supports implements in their holders. A support block interacts with an implement holder. An implement holder is slid in a transverse direction to remove it from the support block. A curved guide wall is in the path of the implement holder and helps guide the implement holder in a longitudinal direction away from the vertical support wall for removal from storage. The vertical wall may be magnetic and the support unit comprises a magnet. Other embodiments may be non-magnetic and have support blocks secured to the vertical support wall by mechanical means.

3 Claims, 10 Drawing Sheets

(56) References Cited

U.S. PATENT DOCUMENTS

| | | | | |
|---|---|---|---|---|
| 6,193,119 | B1 * | 2/2001 | Schwarm | A45F 5/021 224/904 |
| 10,022,855 | B2 * | 7/2018 | Hintze | B25H 3/00 |
| 10,492,631 | B2 * | 12/2019 | Velderman | A47F 5/0853 |
| 12,075,929 | B2 * | 9/2024 | Rosilier | A47B 96/068 |
| 2005/0242251 | A1 * | 11/2005 | Licht | B26B 29/025 206/317 |
| 2009/0255133 | A1 * | 10/2009 | Bonapace | A47G 21/14 248/37.3 |
| 2019/0063871 | A1 * | 2/2019 | Cain | F41C 33/06 |

* cited by examiner

SYSTEM FOR STORING AND ACCESSING ELONGATED IMPLEMENTS IN THEIR HOLDERS

CROSS REFERENCE TO RELATED APPLICATION

This patent application claims priority to U.S. Provisional Patent Application Ser. No. 63/437,547 filed Jan. 6, 2023, which is incorporated herein by reference in its entirety.

FIELD

The present subject matter relates to accessibly storing and supporting elongated implements in protective holders, such as knives in scabbards.

BACKGROUND

A user population within the present field includes hunters, military personnel, law enforcement officers, and knife collectors. Users need to be protected from blades when they are carrying the knives or other implements. Users need to hang or secure an implement such as a knife in a scabbard in a vertical disposition. Many implements with a predominant axial direction are housed in protective holders when carried by a user and removed from the holder when the user takes action with the implement. These need to be housed in protective holders when they are not in use. Examples include knives housed in scabbards or sheaths. Other examples of implements and protective holders include swords and scabbards and guns and holsters. It is necessary to provide storage for the implements. Efficient use of storage space often employs vertical surfaces. Prior art storage means for implements utilizing vertical surfaces require that the implement be removed from its holder. This is suitable for display of collectible knives but is impractical for knives used in practical applications. Knives without sheaths are also stored in lockboxes or drawers. A common method for storing implements inside their holders is arranging them in a storage drawer. When in use, a knife housed in a sheath can be supported to a knife sheath hanger that a user can wear on a belt.

A user making practical use of the knife or other implement needs to select a particular knife and remove it from storage quickly and easily. Prior art storage requires either separate storage of sheaths from knives or requires cumbersome sorting of knives housed in sheaths. There is a need to provide storage allowing for maximum utility in deploying the instruments and holders.

U.S. Pat. No. 4,404,747 discloses a knife and sheath combination. A spring-loaded detent projects against inadvertent removal of the knife. The sheath includes a belt loop. However, teachings are not provided regarding storage of the knife and sheath combination.

U.S. Pat. No. 4,601,400 discloses a knife holder with an articulated vertical wall. In a first position, a lower section is at an angle with respect to the vertical axis. The lower section has slots for receiving knives. When the lower section is loaded, the top of the section is pushed back so that the articulated wall defines a vertical surface. This is an example of the prior art storage means which can house only knives. It cannot store knives placed within their scabbards.

U.S. Pat. No. 4,492,028 discloses a wall mounted knife holder. The holder may tilt away from a supporting vertical wall for storage and removal of a knife. The holder cannot store a scabbard. This apparatus does not permit a user to remove a knife without the step of finding and using a scabbard in which to place the knife.

United States Patent Application Publication No. 2021/0062966 discloses a mounting device including a bracket fastened to a wall and a cover attached to an object support. The cover slides over the bracket. In this way an object may be supported to a wall in an embodiment not using magnets. This mounting device only supports a single object. It does not interact with a vertical implement in a protective sheath.

U.S. Pat. No. 6,119,907 discloses a convertible shoulder arm case that converts to a belt allowing a hunter to carry his weapon and other equipment. This discloses an implement carried by a user and not an implement that is stored.

United States Patent Application Publication No. 2015/0351523 discloses a tool holder that can be worn on a user's belt. The tool holder includes a first pocket that receives a tool and a locking mechanism can secure the tool in the pocket. The pocket is not conveniently removable from the tool holder for storing the tool.

U.S. Pat. No. 6,491,191 discloses an example of an elongated implement that is not a knife. More specifically, it is a caulking gun in a caulking gun holster.

SUMMARY

Briefly stated, in accordance with the present subject matter, a system is provided for storing an elongated implement in a holder, such as a knife in a sheath. The system provides for quick and safe access of an individual implement without disturbance to other stored implements in a storage cabinet or other container. It allows for capable and efficient storage allowing for quick, safe access to an implement suitable for immediate deployment. Storage permits removing the holder from the system and immediately placing it in to use, as by hanging the holder on a user's belt. The system includes a vertical wall or a support surface providing at least a portion of support in a vertical direction. A subsystem comprises a support unit interacting with the implement holder. In one form, the vertical wall is magnetic and the support contains a magnet having magnetic strength proportioned to the weight of the implement and holder. Strength of attraction of the vertical wall to the support is optimized with respect to ease of movement of the support with respect to the vertical wall. Other embodiments may be non-magnetic, such as drywall, wood, or polymer. These non-magnetic embodiments have the support unit fastened to a vertical support by mechanical means. These non-magnetic supports can include pegboards, polymer sheets, and wooden wall units. The vertical wall may be part of a cabinet. Cabinets can include gun safes and display cabinets. The support may comprise a knife sheath/belt hanger, so that a user can immediately transfer the implement from being stored to being deployed.

The support comprises a first arm for engagement with the vertical wall and extending in a longitudinal direction. A second arm may be parallel to the first arm for receiving a weight-bearing component of the holder. A transverse arm joins the first arm and the second arm and determines spacing between them.

DETAILED DESCRIPTION

Figure 1:
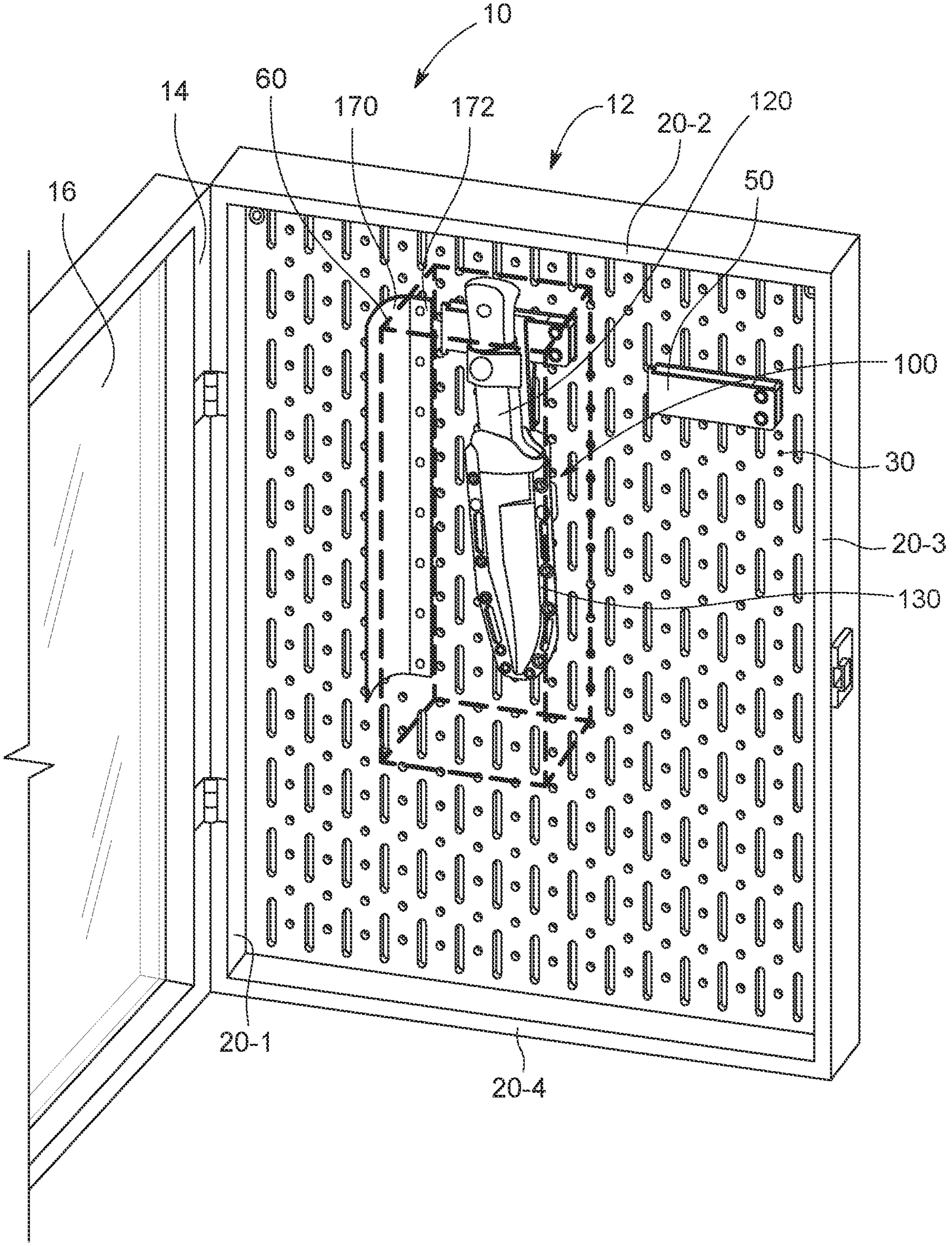
FIG. 1 is a perspective view of a system for storing, supporting, and providing access to scabbards which hold knives.

FIG. 1 is a perspective view of a system for storing, supporting, and providing access to tool units 100 including elongated implements in their respective holders constructed in accordance with the present subject matter. Holders may comprise scabbards 130 and elongated implements may comprise knives 120. A storage system 10 comprises at least a planar support wall 30 and further may comprise a storage cabinet 12 having a door 14, shown partially broken away. The door 14 preferably comprises a window 16. The storage cabinet 12 includes side walls 20-1, 20-2, 20-3, and 20-4, collectively referred to as the side walls 20. The side walls 20 surround the support wall 30. The support wall 30 is preferably maintained in a vertical position and extends along a vertical degree of freedom. The side walls 20 project in a longitudinal direction away from the support wall 30. The width of the storage cabinet 12 extends in a transverse direction.

The storage system 10 stores sheaths, scabbards, and containers for other elongated instruments within the storage cabinet 12. The present system will find primary application in storing knives in scabbards or sheaths. For ease in description all implements for housing a knife will be referred to as a scabbard. The present subject matter is also applicable to elongated tools which may be housed in containers. For example, a slide rule may correspond to a knife and a leather case may correspond to a scabbard. A tool unit 100 is a term used in the present description to describe a scabbard and a knife together. The present system allows a user to view many tool units at once and select a tool unit without having to clear a path for the tool unit between other tool units 100 in a storage drawer. Prior art systems for supporting knives in full view and in vertical disposition have not included a support for holding a knife and scabbard or a knife and sheath together. Each tool unit 100 is supported to a storage block 50. Structure and functioning of the storage block 50 is described below with respect to FIGS. 6-10. A volume in dashed lines in FIG. 1 is a storage space 60 which extends beneath the storage block 50. The storage space 60 is a volume in which a preselected tool unit 100 will fit. The storage space 60 defines a volume which should not overlap a storage space 60 for another storage block 50.

In order to facilitate convenience and reliability in placing and removing tool units 100 from the storage cabinet 12 or other storage means, a guide wall 170 is provided adjacent to all or selected ones of the storage blocks 50. The guide wall 170 extends in a vertical degree of freedom substantially in vertical registration with the implement space. The guide wall 170 is integral with a flat mounting strip 172 which is fixed to the support wall 30. The guide wall 170 is transversely displaced from said storage block 50 by a distance to engage an implement holder within the tool unit 100 in the transverse direction as the implement holder is removed from the system 10. The guide wall 170 is curved and shaped to produce a vector in the longitudinal direction when the implement holder moves in the transverse direction during removal from the storage system. The guide wall 170 need not be a continuous wall. It may comprise a plurality of elements fitting within an envelope defining a wall.

The guide wall 170 constrains travel of each tool unit 100 so that it may be removed speedily from the storage cabinet 12 without engaging any other implement. The guide wall 170 facilitates convenience and reliability in placing and removing tool units 100 from the storage system 10. The guide wall 170 constrains travel of a tool unit 100 creating a vector in a direction away from the support wall 30 in response to movement of the tool unit 100 in a transverse direction. This not only provides a distinct improvement in accessibility but allows for handling the desired tool without slipping or bouncing into other units.

The guide wall 170 also directs the travel of the tool unit 100 in a direction away from the support wall 30 and the storage cabinet 12. The storage block 50 holds the tool unit 100 so that the tool unit 100 must move in the transverse direction when being removed. When a tool unit 100 is removed from the storage block 50 and hits the curved guide wall 170, it hits with a force F1. This force is resolved into vectors with force F2 in the longitudinal direction and force F3 in the transverse direction. In the absence of the guide wall 170, a user could direct the tool unit 100 toward the glass panel 16 (FIG. 1) when removing the tool unit 100 hastily, creating the potential for breaking glass and injuring user 2 (not shown). This possibility is prevented by use of the guide wall 170.

Embodying the present subject matter, the cabinet 12 enables storage and viewing of a number of tool units 100 at the same time. The cabinet is designed to house each tool or implement to be visible distinctly from the others and be able to obtain access individually while protecting each implement and sheath. The cabinet 12 is also representative of many specific forms of storage enclosures. These include a gun safe, a display case, and a shipping container.

Figure 2:
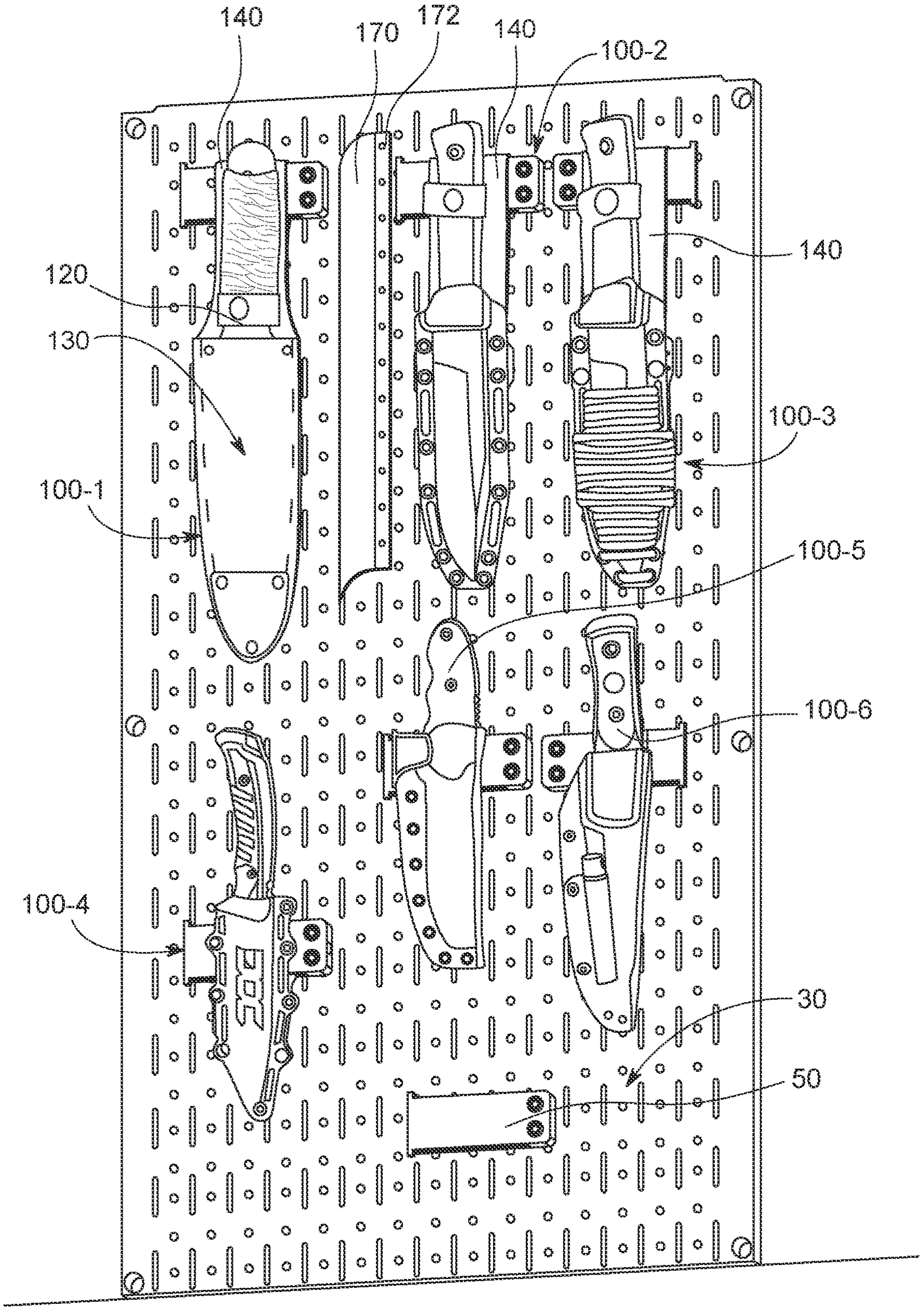
FIG. 2 is an isometric view of one form of the system of FIG. 1, including guide means for tool units.
Figure 3:
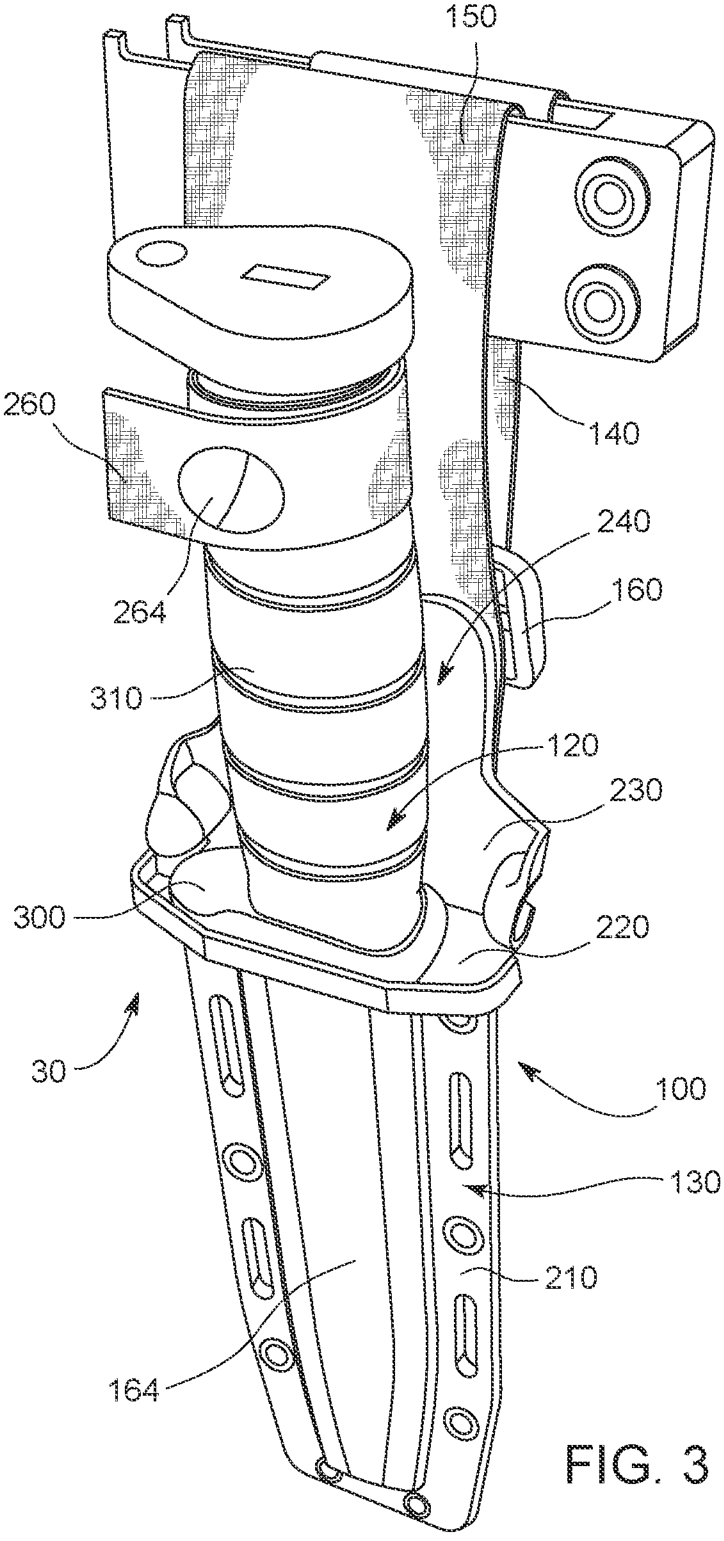
FIG. 3 is an isometric view of a nominal sheath and knife suspended from a hanger which interacts with a support subsystem.

FIG. 2 is an isometric view of one form of the system of FIG. 1, including guide means for tool units. FIG. 3 is an isometric view of a nominal sheath and knife suspended from a hanger which interacts with a support subsystem. FIG. 2 and FIG. 3 are taken together. FIG. 2 illustrates versatile capabilities of the present system in handling tool units of various types. FIG. 2 incorporates multiple tool units 100, including a tool unit 100-1 comprising a knife 120 and a scabbard 130. Tool units 100 are arranged in an array in which storage space 60 (FIG. 1) are positioned with respect to other storage spaces 60 so that tool units 100 will be free of engagement with other tool units 100. Other tool units are illustrated including 100-2 through 100-6. The tool units 100 also includes a belt hanger 140. The belt hanger 140 is a flexible strip supported at one end to a rear surface of the scabbard 130. Belt hangars 140 are attached to tool units 100. Each of the tool units 100 includes a scabbard 130. The belt hangers 140 are each formed into a loop 150 that slides through a loop fitting 160 (FIG. 3) that provides for adjustability of the length of the loop 150.

Figure 4:
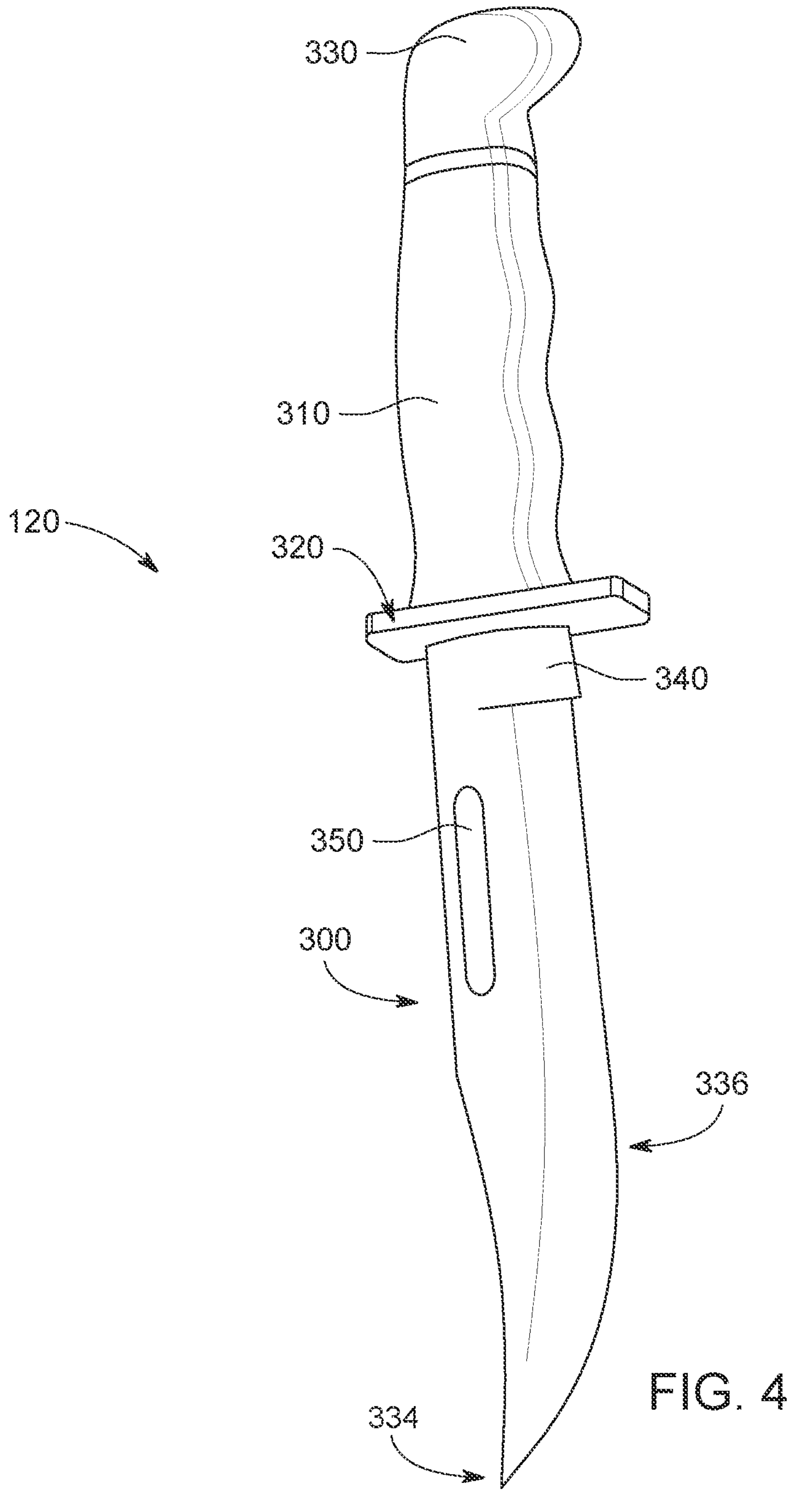
FIG. 4 is a perspective view of an exemplary knife.

FIG. 3 is used to further describe the structure of the scabbard 130. A central housing 164 receives a knife blade 306 (FIG. 4). The central housing 164 may have an elongated flange 210 extending from its periphery. The elongated flange 210 is used in selected designs of a scabbard 130. Front and rear portions of the scabbard 130 may also be secured to each other by sewing or other fastening. At an upper end of the central housing 164 an endplate 220 is provided to surround an opening which permits insertion of the knife 120. The endplate 220 also comprises a stop to limit travel of the knife 120 into the scabbard 130. The scabbard 130 further comprises a backplate 230 that surrounds a portion of the periphery of the endplate 220. The backplate 230 provides a surface that will prevent the knife from projecting toward a user as the knife 120 is being inserted in the scabbard 130.

FIG. 4 is a perspective view of an exemplary knife 120 and illustrates the terminology in describing parts of a knife 120. The present subject matter may store many different forms of knives 120. In the present illustration, the knife 120 is a hunting knife. The knife 120 comprises a blade 300 and a handle 310. A bolster 320 separates the blade 300 from the handle 310. The bolster 320 is analogous to the hilt of a sword. The handle 310 has a butt 330 at an upper end away from the bolster 320. The blade 300 comprises a point 334 at a lower end of the knife 120. The terms upper and lower are used only to denote relative positioning. A bevel 336 extends along a line or curve between the point 334 and a choil 340. The choil 340 is a portion of the blade adjacent the bolster 320. The bevel 336 includes a cutting edge 338 of the blade 300. On a side of the blade 300 transversely opposite the bevel 336, a spine 350 may be provided to reinforce the blade 300. Establishing terminology for knife structure facilitates use in employing combinations in accordance with the present subject matter.

Figure 5:
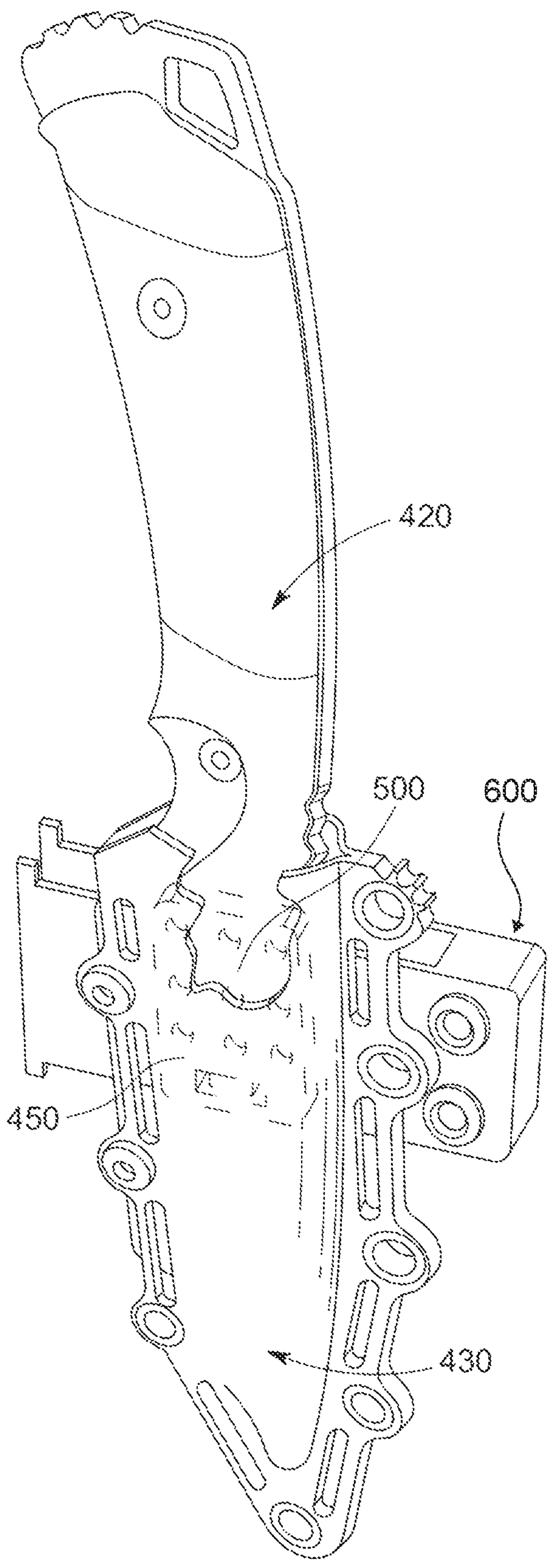
FIG. 5 is an isometric view of a further embodiment of a storage system in which a storage block engages a scabbard directly without an intermediary hanger.

FIG. 5 is an isometric view of a further embodiment of a storage system 10 in which a support block engages a scabbard directly without an intermediary hanger. This further embodiment includes a knife 420 and a scabbard 430. The scabbard 430 is partially broken away to illustrate a blade 500 received in the scabbard 430. The present embodiment does not include a bolster on the knife 420 or an endplate 220 on the scabbard 430. In this embodiment, the scabbard 430 is supported to a storage block 600. The scabbard 430 is not suspended from a hanger.

FIG. 5 demonstrates how a tool unit 100 is stored without the use of a belt hanger. It also demonstrates how the tool unit 100 is set apart from other tools left sitting on a shelf all mingled together. The tool units 100-4 through 100-6 in FIG. 2 are supported in a manner illustrated in FIG. 5. A rigid loop 450 fastened to a back of the scabbard 430 slides over a portion of the storage block 600. The embodiments of FIG. 3 and FIG. 5 will support virtually all types of scabbards 430.

Figure 6:
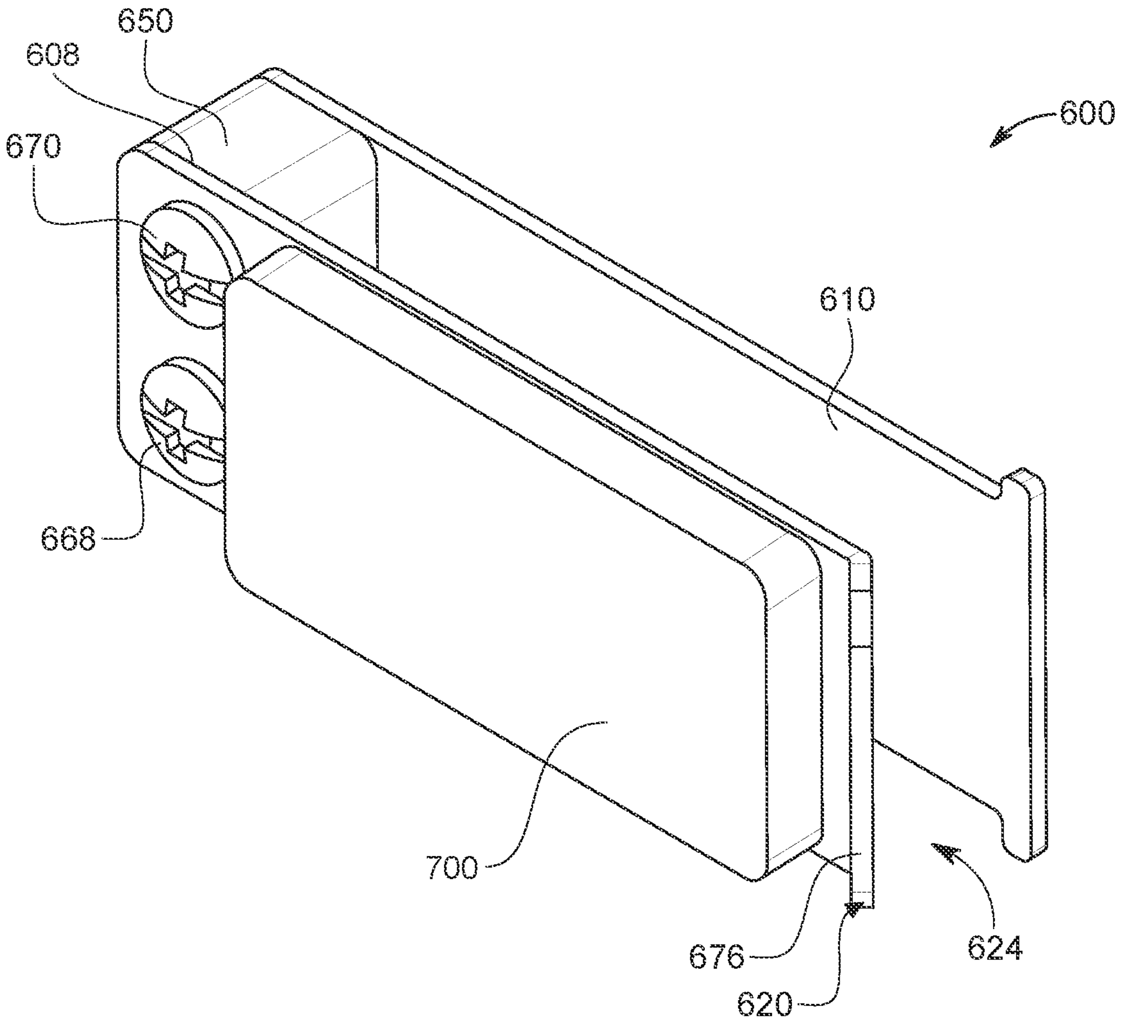
FIG. 6 is an isometric view of a storage block.
Figure 7:
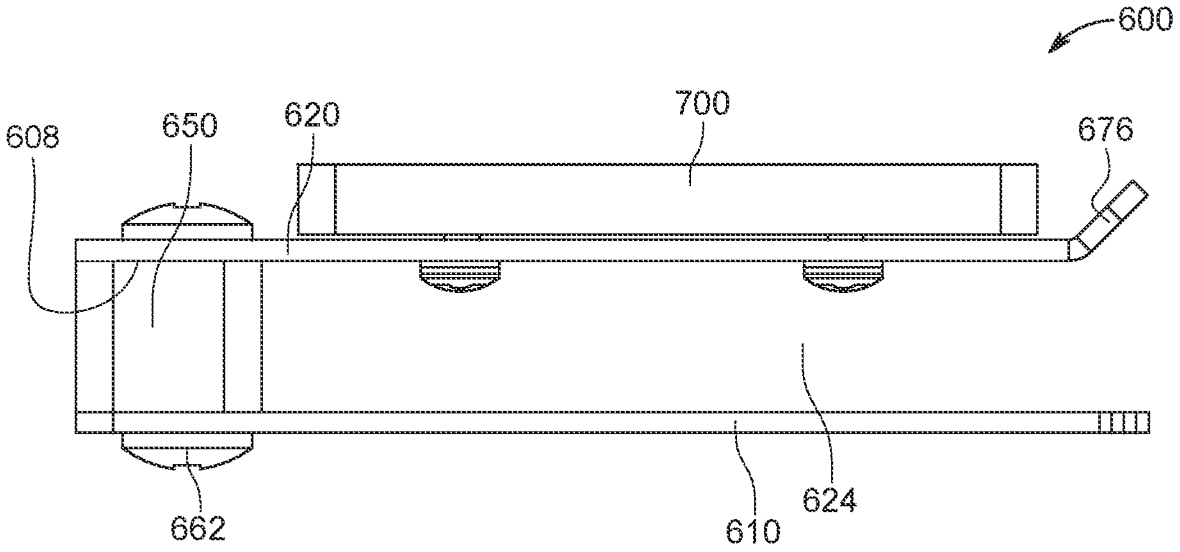
FIG. 7 is a plan view of the storage block.
Figure 8:
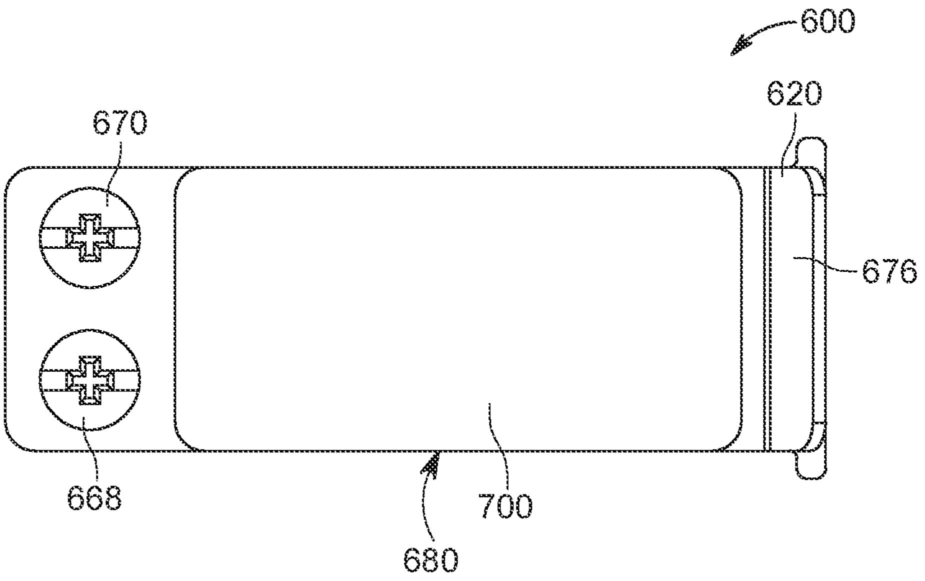
FIG. 8 is a front elevation of the storage block.
Figure 9:
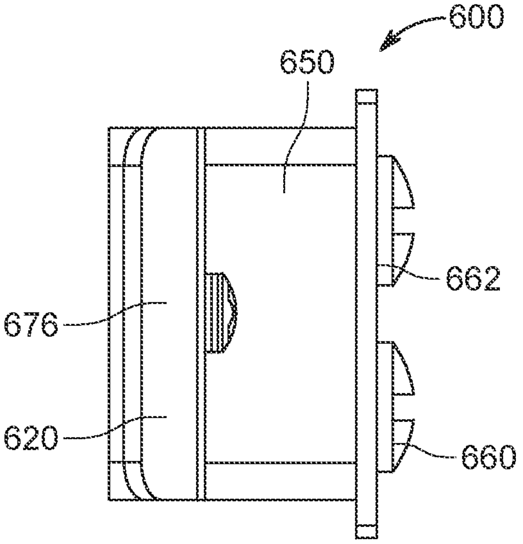
FIG. 9 is a side elevation of the storage block.
Figure 10:
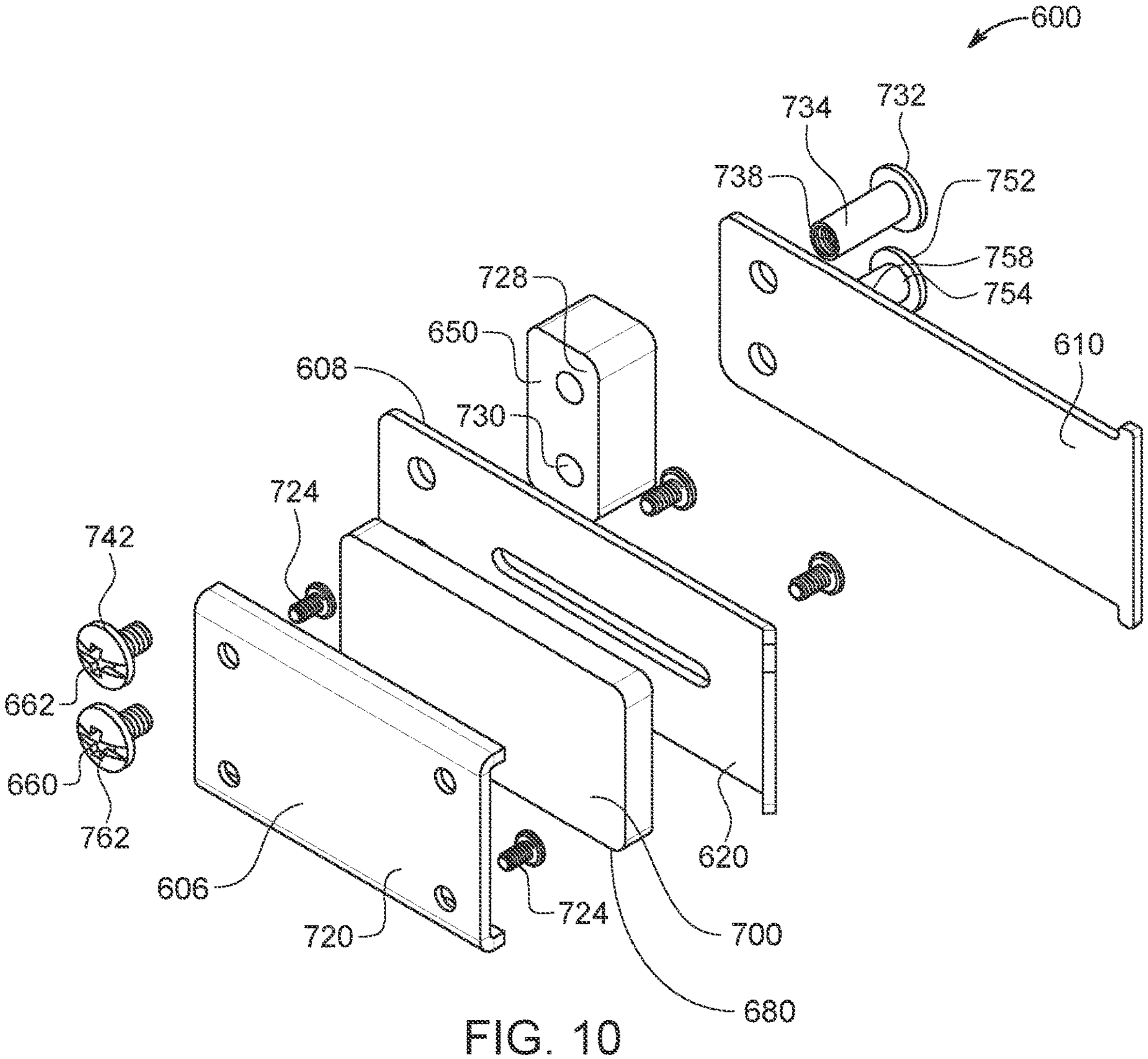
FIG. 10 is an exploded view of the storage block.

FIG. 6 is an isometric view of a storage block 600. FIG. 7 is a side elevation of the storage block 600. FIG. 8 is a plan view of the storage block 600 and FIG. 9 is a rear elevation of the storage block 600. FIG. 10 is an exploded view of the storage block 600. FIGS. 6 through 10 are taken together. Storage block 600 is provided for interaction with the rear wall 30 of the cabinet 12 (FIG. 1).

The storage block 600 is substantially U-shaped and comprises a front arm 610 and a rear arm 620. Preferably, the front arm 610 and the rear arm 620 are parallel. The rear arm 620 has a forward surface 608 (FIG. 7). The front arm 610 is a first wall. The rear arm 620 is a second wall. However, this is not necessary. The front arm 610 will support a scabbard or a hanger from which a scabbard is suspended. In an alternative embodiment, the storage block 600 may be unitary. First and second fasteners 660 and 662 secure the first arm 610 to a front side of the spacer bar 650. Third and fourth fasteners 668 and 670 secure the second arm 620 to a rear side of the spacer bar 650. The volume between the first arm 610 and the second arm 620 comprises a storage volume 624. A distal end 676 of the second arm 620 is angled away from the first arm 610. The distal end 676 acts as a guide when one side of a support element of the scabbard 130 is slid into the storage area 624.

A securing bar 680 is used to secure the storage block 600 to the rear wall 30. In one form, the rear wall 30 is metal. The securing bar 680 comprises a magnet 700. The magnet 700 may also be used in an embodiment in which the support wall 30 is non-magnetic. A mounting plate 720 is provided which is fastened to the support wall 30 by screws 724 or other fasteners. The mounting plate 720 is metal. The mounting plate 720 has a rear surface 606. Once secured to the rear wall 30 it provides a magnetic surface to which the magnet 700 may be retained. In the embodiment of FIG. 10, the spacer bar comprises first and second bores 728 and 730. A first feedthrough fastener 732 is inserted into the first bore 728. The feedthrough fastener 732 has an axially extending body 734 with an internal thread 738. The internal thread 738 receives a screw 742 which is tightened into the thread 738 to hold the first arm 610, the spacer bar 650 and the second arm 620. A second feedthrough fastener 752 is inserted into the second bore 730. The second feedthrough fastener 752 has an axially extending body 754 with an internal thread 758. The internal thread 758 receives a screw 762 which is tightened into the bore 730 to hold the first arm 610, the spacer bar 650 and the second arm 620.

The storage block 600 provides a reliable way of supporting tool units 100 of many types. Many options in construction are available. The arms 610 and 620 may be substantially rigid to accommodate heavier tool units 100. The arms 610 and 620 may each have a spring constant to facilitate ease in handling of tool units 100. These embodiments enable convenient and reliable handling of tool units enabling, for example, officers and hunters speedy and successful access to necessary implements. A user may view all implements in their scabbards in order to be able to select a most appropriate implement without having to fumble through two or more places to select an implement. Different sizes of support blocks 600 may be secured to the same support wall 30 so that implements of different sizes may be stored together.

Figure 11:
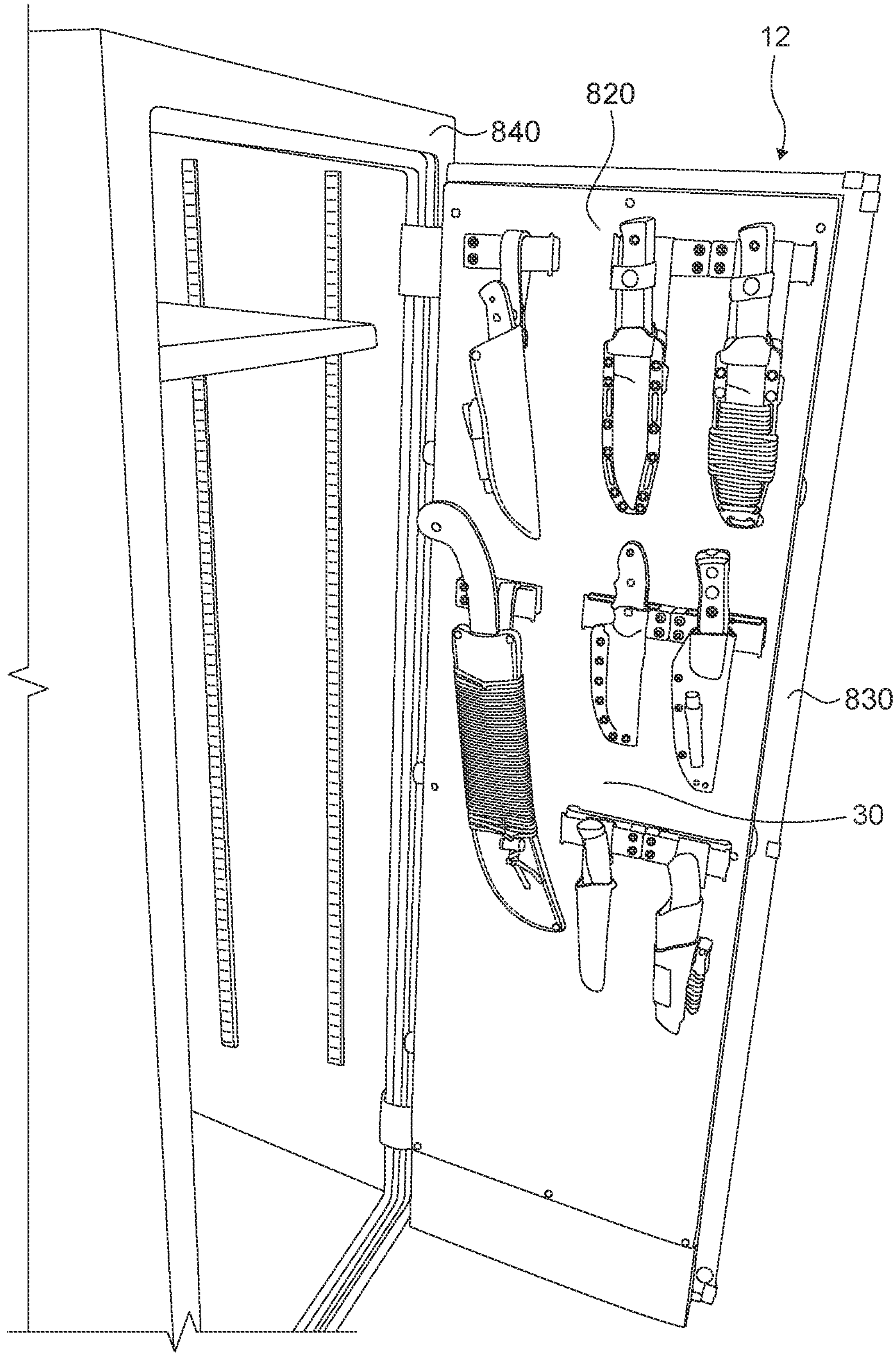
FIG. 11 is a perspective view of a cabinet storing multiple implements which interact to provide reliable placement and removal of implements in holders.

FIG. 11 is a perspective view of a cabinet storing multiple implements which interact to provide reliable placement and removal of implements in holders. In FIG. 11, the support wall 30 of the storage cabinet 12 comprises an inner surface 820 of a door 830 of a gun safe 840. In this embodiment, magnetic support blocks 700 (FIG. 7) are supported to the inner surface 820. FIG. 11 is used to suggest how the present subject matter may be used in a wide variety of contexts. This gun safe 840 illustrates how multiple implements of varying size and type can be easily accessed without interfering with other implements. Space is provided to identify as well as take possession of the necessary tool unit 100 as needed.

The present specification will enable those skilled in the art to provide many different constructions, each in accordance with the present subject matter. The foregoing detailed description, including what is described in the abstract, the apparatus of the present invention has been described with reference to specific embodiments thereof. It will be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The invention claimed is:

1. A storage system for storing and accessing tool units comprising elongated implements in their respective holders, the storage system comprising:

a. a support wall providing support within a vertical degree of freedom and extending in a transverse direction;

b. a plurality of storage blocks each defining a storage space and spaced with respect to one another to define an array of storage modules;

c. each storage block of said plurality of storage blocks being supported to said support wall, said storage block having a rear side adjacent said support wall and having a front side, said front side comprising a transversely extending substantially planar first wall disposed for supporting a tool unit;

d. said rear side comprising a mounting element having a rear surface dimensioned for being secured to said support wall and a forward surface;

e. a substantially planar second wall secured to said mounting element and being displaced from said first wall to define a storage volume;

f. one of said first wall or said second wall having a distal end portion at an angle with respect to said first wall or said second wall respectively and shaped to form a guide for directing a hanger affixed to a holder into the storage volume to facilitate moving an implement holder hanger into the storage volume;

g. said first wall defining a longitudinal implement space below said first wall; and h. a guide wall extending in the longitudinal direction and transversely displaced from said storage block by a distance to engage an implement holder in the transverse direction as the implement holder is removed from the system, said guide wall shaped to produce a vector in a lateral dimension when an implement holder moves in the transverse direction during removal from said storage system;

i. wherein said mounting element comprises a securing bar in the form of a magnet and further comprises a mounting plate supporting said securing bar and fasteners projecting through said mounting plate and securing said mounting plate to said support wall.

2. The storage system according to claim 1 further comprising a plurality of axially projecting side walls that form an enclosure surrounding a predetermined portion of said support wall.

3. The storage system according to claim 2 further comprising an enclosure cover pivotally supported to said enclosure.

* * * * *